(12) United States Patent
Strehlow et al.

(10) Patent No.: US 10,732,195 B2
(45) Date of Patent: Aug. 4, 2020

(54) VIBRATING BEAM ACCELEROMETER

(71) Applicant: Honeywell International Inc., Morris Plains, NJ (US)

(72) Inventors: John Strehlow, Mukilteo, WA (US); Mitchell Novack, Kenmore, WA (US)

(73) Assignee: Honeywell International Inc., Morris Plains, NJ (US)

( * ) Notice: Subject to any disclaimer, the term of this patent is extended or adjusted under 35 U.S.C. 154(b) by 240 days.

(21) Appl. No.: 16/006,563

(22) Filed: Jun. 12, 2018

(65) Prior Publication Data

US 2019/0234988 A1    Aug. 1, 2019

Related U.S. Application Data

(60) Provisional application No. 62/622,548, filed on Jan. 26, 2018.

(51) Int. Cl.
*G01P 15/02* (2013.01)
*G01P 15/097* (2006.01)
(Continued)

(52) U.S. Cl.
CPC .......... *G01P 15/02* (2013.01); *G01C 19/5607* (2013.01); *G01P 15/097* (2013.01); *G01C 19/5663* (2013.01)

(58) Field of Classification Search
CPC ... G01P 15/02; G01P 15/097; G01C 19/5607; G01C 19/5663
(Continued)

(56) References Cited

U.S. PATENT DOCUMENTS

| 4,144,765 A | * | 3/1979 | Aske | G01P 15/132 |
| | | | | 267/154 |
| 4,944,184 A | * | 7/1990 | Blake | G01P 15/125 |
| | | | | 73/514.23 |

(Continued)

FOREIGN PATENT DOCUMENTS

| CN | 205861251 U | 1/2017 |
| EP | 2105747 A2 | 9/2009 |

(Continued)

OTHER PUBLICATIONS

Extended Search Report from counterpart European Application No. 19153164.9, dated Jun. 21, 2019, 11 pp.
(Continued)

*Primary Examiner* — John Fitzgerald
*Assistant Examiner* — Rodney T Frank
(74) *Attorney, Agent, or Firm* — Shumaker & Sieffert, P.A.

(57) ABSTRACT

A proof mass assembly comprising a first and a second resonator, each resonator comprising a first and a second bond pad, and a pair of elongated tines, wherein the first and the second bond pads are positioned at opposite ends of the elongated tines; a proof mass comprising a first and a second major surface, the first major surface of the proof mass comprising a bond region including at least one channel extending in a direction substantially parallel to a longitudinal axis of the elongated tines of the first resonator; a proof support comprising a first and a second major surface; at least one flexure connecting the proof mass to the proof support; and an adhesive bonding the first bond pad of the first resonator to the bond region and bonding the second bond pad of the first resonator to the first major surface of the proof support.

20 Claims, 10 Drawing Sheets

(51) Int. Cl.
  *G01C 19/5607* (2012.01)
  *G01C 19/5663* (2012.01)

(58) Field of Classification Search
  USPC .............................. 73/514.36, 514.21–514.24
  See application file for complete search history.

(56) References Cited

U.S. PATENT DOCUMENTS

| | | |
|---|---|---|
| 5,391,844 A | 2/1995 | Johnson et al. |
| 6,892,578 B2 | 5/2005 | Saitoh et al. |
| 7,107,840 B2 | 9/2006 | Foote et al. |
| 7,541,574 B2 | 6/2009 | Ninomiya et al. |
| 7,571,647 B2 | 8/2009 | Takemasa et al. |
| 7,716,984 B2 | 5/2010 | Sakaguchi |
| 8,384,486 B2 | 2/2013 | Nishio |
| 9,009,947 B2 | 4/2015 | Starzynski |
| 9,257,959 B2 | 2/2016 | Yamada |
| 9,344,058 B2 | 5/2016 | Yamada |
| 9,470,708 B2 | 10/2016 | Jeong et al. |
| 2001/0054313 A1 | 12/2001 | Williams |
| 2004/0187578 A1 | 9/2004 | Malametz et al. |
| 2011/0226731 A1 | 9/2011 | Funabiki et al. |
| 2011/0234206 A1 | 9/2011 | Kawakubo et al. |
| 2014/0116137 A1 | 5/2014 | Shinoda et al. |
| 2014/0266485 A1 | 9/2014 | Yamada |
| 2016/0056790 A1 | 2/2016 | Yamada |
| 2017/0199217 A1 | 7/2017 | Naruse et al. |
| 2018/0074090 A1* | 3/2018 | Boysel ............... G01C 19/5712 |

FOREIGN PATENT DOCUMENTS

| | | |
|---|---|---|
| JP | 2006250702 A | 9/2006 |
| WO | 9522062 A1 | 8/1995 |
| WO | 9927373 A1 | 6/1999 |

OTHER PUBLICATIONS

Li, et al., "Microresonant accelerometer composed of silicon substrate and quartz double-ended tuning fork with temperature isolator," Micro & Nano Letters, Sep. 2014, vol. 9, Iss. 10, pp. 664-668.
Response to Extended Search Report dated Jun. 21, 2019, from counterpart European Application No. 19153164.9, dated Dec. 20, 2019, 17 pp.

* cited by examiner

VIBRATING BEAM ACCELEROMETER

This application claims the benefit of U.S. Provisional Application No. 62/622,548 filed Jan. 26, 2018, which is incorporated herein by reference in its entirety.

TECHNICAL FIELD

The present disclosure relates to vibrating beam accelerometers, also referred to as resonating beam accelerometers.

BACKGROUND

Accelerometers function by detecting the displacement of a proof mass under inertial forces. One technique of detecting the force and acceleration is to measure the displacement of the mass relative to a frame. Another technique is to measure the stress induced in resonators as they counteract inertial forces of the proof mass. The stress may, for example, be determined by measuring the change in the frequencies of the resonators as the accelerometer is subjected to an outside force.

SUMMARY

In some examples, the disclosure describes vibrating beam accelerometers (VBAs) that have bonding mechanisms between the proof mass and resonators resulting in accelerometers with improved accuracy and precision and lower measurement error.

In some examples, the disclosure describes a proof mass assembly comprising a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator; a proof mass comprising a first major proof mass surface and a second major proof mass surface, wherein the first major proof mass surface comprises a bond region comprising at least one channel extending in a direction substantially parallel to a longitudinal axis of the respective pair of elongated tines of the first resonator; a proof support comprising a first major proof support surface and a second major proof support surface; at least one flexure connecting the proof mass to the proof support; and an adhesive bonding the respective first bond pad of the first resonator to the bond region of the first major proof mass surface, bonding the respective second bond pad of the first resonator to the first major proof support surface, bonding the respective first bond pad of the second resonator to the second major proof mass surface, and bonding the respective second bond pad of the second resonator to the second major proof support surface.

In some examples, the disclosure describes a proof mass assembly comprising a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator; the respective first bond pad and the respective second bond pad each comprising a respective slot extending in a direction substantially perpendicular to a longitudinal axis of the respective elongated tines, each respective slot comprising a length measured in the direction substantially perpendicular to the longitudinal axis of the respective elongated tines; a proof mass comprising a first major proof mass surface and a second major proof mass surface, wherein the first major proof mass surface comprises a bond region, the bond region being edged by at least a pair of channels in the first major proof mass surface that extend in a direction substantially parallel with the longitudinal axis of the first resonator, the bond region comprising a width measured in the direction substantially perpendicular to the longitudinal axis of the first resonator, wherein the width is about equal to or less than the length of the respective slot of the respective first bond pad of the first resonator; a proof support comprising a first major proof support surface and a second major proof support surface; at least one flexure connecting the proof mass to the proof support; and an adhesive bonding the respective first bond pad of the first resonator to the bond region of the first major proof mass surface, wherein an edge of the bond region is aligned substantially flush with an edge of the respective slot of the respective first bond pad, bonding the respective second bond pad of the first resonator to the first major proof support surface, bonding the respective first bond pad of the second resonator to the second major proof mass, and bonding the respective second bond pad of the second resonator to the second major proof support surface.

In some examples, the disclosure describes a proof mass assembly comprising a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator; a proof mass comprising a first major proof mass surface and a second major proof mass surface, wherein the first major proof mass surface comprises a first bond region comprising at least one channel extending in a direction substantially parallel to a longitudinal axis of the respective pair of elongated tines of the first resonator; a proof support comprising a first major proof support surface and a second major proof support surface, wherein the first major proof support surface of the proof support comprises a second bond region comprising at least one channel extending in a direction substantially parallel to a longitudinal axis of the respective pair of elongated tines of the first resonator; at least one flexure connecting the proof mass to the proof support; and an adhesive bonding the respective first bond pad of the first resonator to the first bond region of the first major proof mass surface and bonding the respective second bond pad of the first resonator to the second bond region of the first major proof support surface, bonding the respective first bond pad of the second resonator to the second major proof mass surface, and bonding the respective second bond pad of the second resonator to the second major proof support surface.

In some examples, the disclosure describes a proof mass assembly comprising a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator; the respective first bond pad and the respective second bond pad each comprising a respective slot extending in a direction substantially perpendicular to a longitudinal axis of the respective elongated tines, each respective slot comprising a length measured in the direction substantially perpendicular to the longitudinal axis of the respective elongated tines; a proof mass comprising a first major proof mass surface and a second major proof mass surface, wherein the first major proof mass surface comprises a first bond region, the first bond region being edged by at least a first pair of channels in the first major proof mass surface that extend in a direction substantially parallel with the longitudinal axis of the first resonator, the first bond region comprising a width measured in the direction substantially perpendicular to the longitudinal axis of the first resonator, wherein the width is about equal to or less than the length of the respective slot of the respective first bond pad of the first resonator; a proof support comprising a first major proof support surface and a second major proof support surface, wherein the first major proof support surface comprises a second bond region, the second bond region being edged by at least a second pair of channels in the first major proof support surface that extend in a direction substantially parallel with the longitudinal axis of the first resonator, the second bond region comprising a width measured in the direction substantially perpendicular to the longitudinal axis of the first resonator, wherein the width is about equal to or less than the length of the respective slot of the respective second bond pad of the first resonator; at least one flexure connecting the proof mass to the proof support; and an adhesive bonding the respective first bond pad of the first resonator to the first bond region of the first major proof mass surface, wherein an edge of the first bond region is aligned substantially flush with an edge of the respective slot of the respective first bond pad, bonding the respective second bond pad of the first resonator to the second bond region of the first major proof support surface, wherein an edge of the second bond region is aligned substantially flush with an edge of the respective slot of the respective second bond pad, bonding the respective first bond pad of the second resonator to the second major proof mass, and bonding the respective second bond pad of the second resonator to the second major proof support surface.

A method of forming the proof mass assembly that comprises a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator; a proof mass comprising a first major proof mass surface and a second major proof mass surface, wherein the first major proof mass surface comprises a bond region comprising at least one channel extending in a direction substantially parallel to a longitudinal axis of the respective pair of elongated tines of the first resonator; a proof support comprising a first major proof support surface and a second major proof support surface; at least one flexure connecting the proof mass to the proof support; and an adhesive bonding the respective first bond pad of the first resonator to the bond region of the first major proof mass surface, bonding the respective second bond pad of the first resonator to the first major proof support surface, bonding the respective first bond pad of the second resonator to the second major proof mass, and bonding the respective second bond pad of the second resonator to the second major proof support surface. The method comprising bonding the respective first bond pad of the first resonator to the bond region of the first major proof mass surface, bonding the respective second bond pad of the first resonator to the first major proof support surface, bonding the respective first bond pad of the second resonator to the second major proof mass, and bonding the respective second bond pad of the second resonator to the second major proof support surface.

The details of one or more examples are set forth in the accompanying drawings and the description below. Other features, objects, and advantages will be apparent from the description and drawings, and from the claims.

DETAILED DESCRIPTION

Navigation systems and positioning systems rely on the accuracy of accelerometers to perform critical operations in various environments. Due to the different types of materials used in producing such accelerometers, thermally induced strains may be imposed on the various components due to changing temperatures. These changes may cause errors and reduce the overall accuracy, precision, or sensitivity of the accelerometer. One source of thermally induced errors in vibrating beam accelerometers (VBAs) relates to the bonding mechanism between resonators of the VBA and the proof mass and proof support of the VBA. Such components are conventionally joined using an adhesive such as an epoxy material, which has a higher rate of thermal expansion compared to the proof mass, the proof support, or the resonators. This differential volume change in response to changes in temperature can induce thermal strain on the resonators, leading to inaccurate measurements.

Figure 1A:
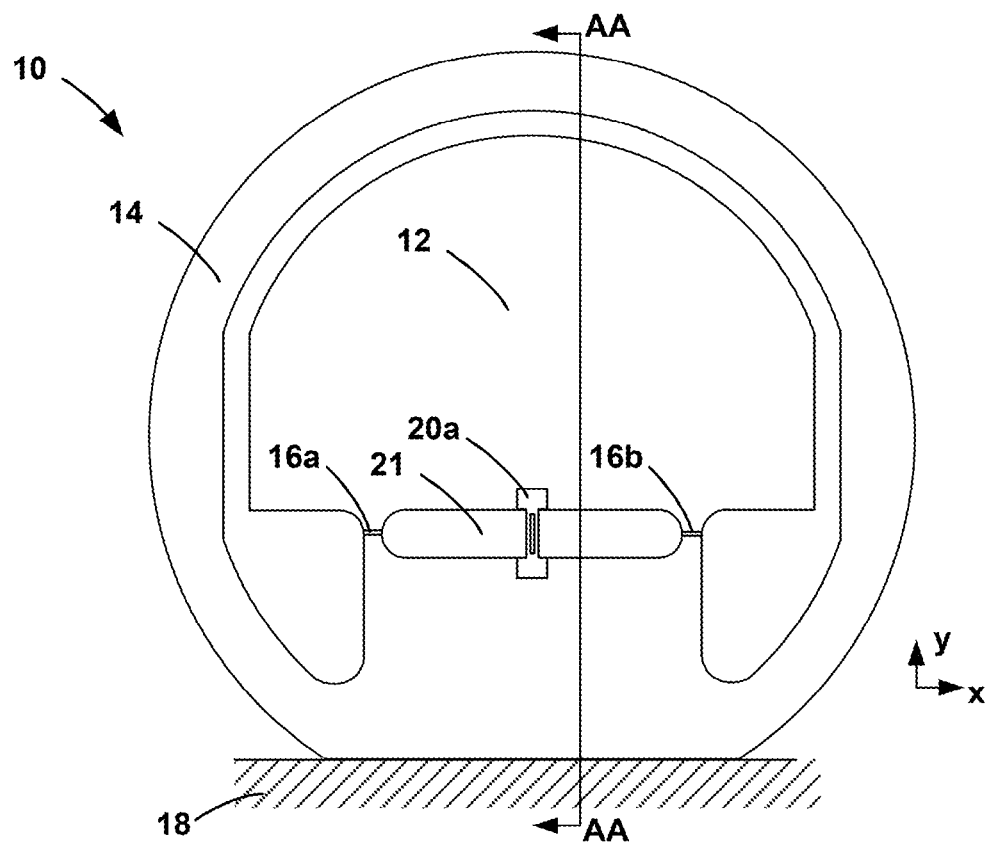
FIG. 1A is a conceptual diagram illustrating a top view of an example proof mass assembly.
Figure 1B:
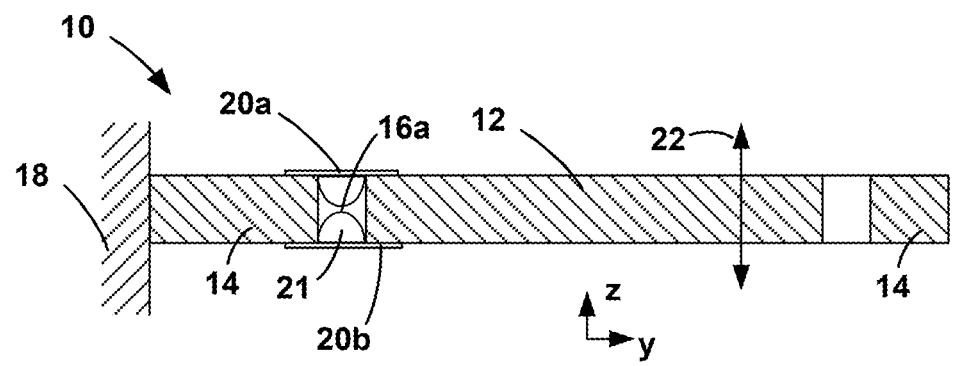
FIG. 1B is a conceptual diagram illustrating a cross-sectional side view of the example proof mass assembly of FIG. 1A along line AA-AA.

In some examples, the present disclosure describes VBAs with a bond structure between the resonators and the proof mass, proof support, or both of the VBA that may reduce the thermal strain on the respective resonators, thereby leading to improved measurement accuracy, precision, and/or sensitivity of the accelerometer. The bond structure includes at least one channel formed in a surface of the proof mass or proof support, where a long axis of the at least one channel is substantially parallel to a longitudinal axis of the resonators. The at least one channel may reduce formation of adhesive fillets in directions perpendicular to the longitudinal axis of the resonators, which may reduce effects of thermal stress due to the different coefficients of thermal expansion FIGS. 1A and 1B are conceptual diagrams illustrating a top view (FIG. 1A) and a cross-sectional side view (FIG. 1B, taken along line AA-AA of FIG. 1A) of an example proof mass assembly 10 that includes a proof mass 12 connected to proof support 14 by flexures 16a and 16b. Proof mass assembly 10 also includes at least two resonators 20a and 20b bridging a gap 21 between proof mass 12 and support 14. Resonators 20a and 20b each have opposing ends mounted to proof mass 12 and proof support 14, respectively. Proof mass assembly 10 may be a proof mass assembly of a VBA.

VBAs operate by monitoring the differential change in frequencies between resonators 20a and 20b. Each of resonators 20a and 20b, also referred to as double ended tuning forks (DETFs), will vibrate at a certain frequency depending on the axial strain (e.g., compression or tension exerted in the y-axis direction of FIGS. 1A and 1B) exerted on the respective resonator 20a or 20b. During operation, proof support 14 may be directly or indirectly mounted to an object 18 (e.g., aircraft, missile, orientation module, etc.) that undergoes acceleration or angle change and causes proof mass 12 to experience inertial displacements in a direction perpendicular to the plane defined by flexures 16a and 16b (e.g., in the direction of arrows 22 or in the direction of the z-axis of FIG. 1B). The deflection of proof mass 12 induces axial tension on one of resonators 20a and 20b and axial compression on the other depending on the direction of the force. The different relative strains on resonators 20a and 20b with alter the respective vibration frequencies of the resonators 20a and 20b. By measuring these changes, the direction and magnitude of the force exerted on object 18, and thus the acceleration, can be measured.

Proof mass assembly 10 may include additional components that are used to induce an oscillating frequency across resonators 20a and 20b such as one or more electrical traces, piezoelectric drivers, electrodes, and the like, or other components that may be used with the final construction of the accelerometer such as stators, permanent magnets, capacitance pick-off plates, dampening plates, force-rebalance coils, and the like, which are not shown in FIGS. 1A and 1B. Such components are known and may be incorporated on proof mass assembly 10 or the final accelerometer by those having ordinary skill in the art.

As shown in FIG. 1A, proof support 14 may be a planar ring structure that substantially surrounds proof mass 12 and substantially maintains flexures 16a and 16b and proof mass 12 in a common plane (e.g., the x-y plane of FIGS. 1A and 1B). Although proof support 14 as shown in FIG. 1A is a circular shape, it is contemplated that proof support 14 may be any shape (e.g., square, rectangular, oval, or the like) and may or may not surround proof mass 12.

Proof mass 12, proof support 14, and flexures 16 may be formed using any suitable material. In some examples, proof mass 12, proof support 14, and flexures 16 may be made of a silicon-based material, a metal alloy such as nickel-chromium alloy or Inconel, or the like.

In some examples, resonators 20a and 20b are made of a piezoelectric material, such as quartz ($SiO_2$), Berlinite ($AlPO_4$), gallium orthophosphate ($GaPO_4$), thermaline, barium titanate ($BaTiO_3$), lead zirconate titanate (PZT), zinc oxide (ZnO), or aluminum nitride (AlN), or the like. In some examples, resonators 20a and 20b may be made of a silicon-based material.

Figure 2:
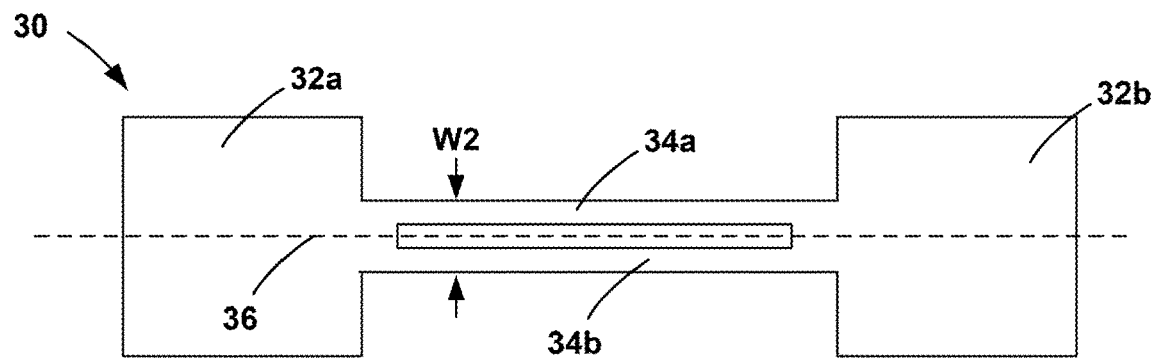
FIG. 2 is an enlarged schematic view of an example resonator.

FIG. 2 is an enlarged schematic view of an example resonator 30 (e.g., one of resonators 20a and 20b) that includes a first and second bond pads 32a and 32b positioned at opposite ends of two elongated tines 34a and 34b that extend parallel to each other along a longitudinal axis 36. As described above, resonator 30 may be referred to as a DETF.

First and second bond pads 32a and 32b of resonator 30 may be secured to either a proof mass or proof support, respectively, using a bonding adhesive such as an epoxy. While the bonding adhesive secures the contacting surfaces of bond pads 32a and 32b and respective proof mass or proof support together, due to capillary effects as the bond pad 32a or 32b and proof mass or proof support are brought together, the bonding adhesive may extrude out at the borders between the bond pad and proof mass or proof support, particularly where the two components to be joined form surfaces that intersect at about 90°. The excess bonding adhesive may form fillets where the excess bonding adhesive is located. These fillets may be difficult to remove without damaging other components of resonator 30.

When these adhesive fillets are oriented substantially perpendicular to longitudinal axis 36 or near tines 34a and 34b, the adhesive fillets may be a significant source of measurement error in a VBA. For example, materials used for the bonding adhesive typically have a coefficient of thermal expansion that is significantly larger than the coefficient of thermal expansion of the materials used for resonator 30 or proof support/mass 38. This may cause unwanted thermally induced strain along longitudinal axis 36 of resonators 30 due to differential volume changes between resonator 30 and the bonding adhesive fillet in response to temperature changes. The additional thermally induced strain caused by the bonding adhesive fillets changes the associated frequency of resonators 30 in a manner un-related to acceleration. Additionally, the visco-elastic or visco-plastic behavior of the bonding adhesive, plus the size and location the bonding adhesive fillets, can result in additional measurement errors being introduced to the VBA.

In some examples, the measurement errors associated with the bonding adhesive fillets may be substantially reduced by changing the location or orientation at which the bonding adhesive fillets are formed. FIGS. 3-5 illustrate various bond structures that may be used to reduce the thermally induced stain caused by the bonding adhesive fillets.

Figure 3A:
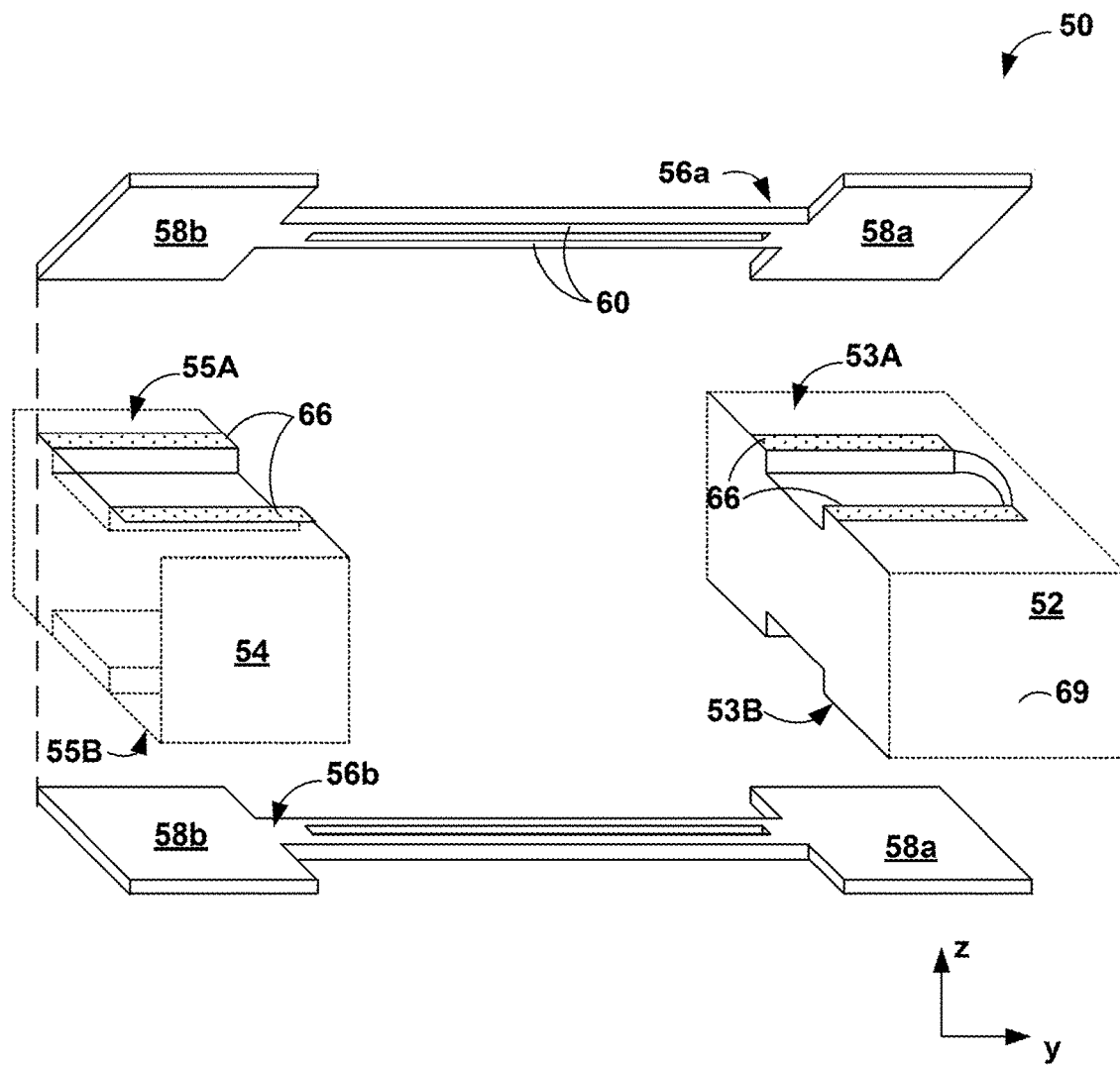
FIGS. 3A-3E are conceptual diagrams illustrating various views of an example proof mass assembly that includes a proof mass, a proof support, and first and second resonators.
Figure 3B:
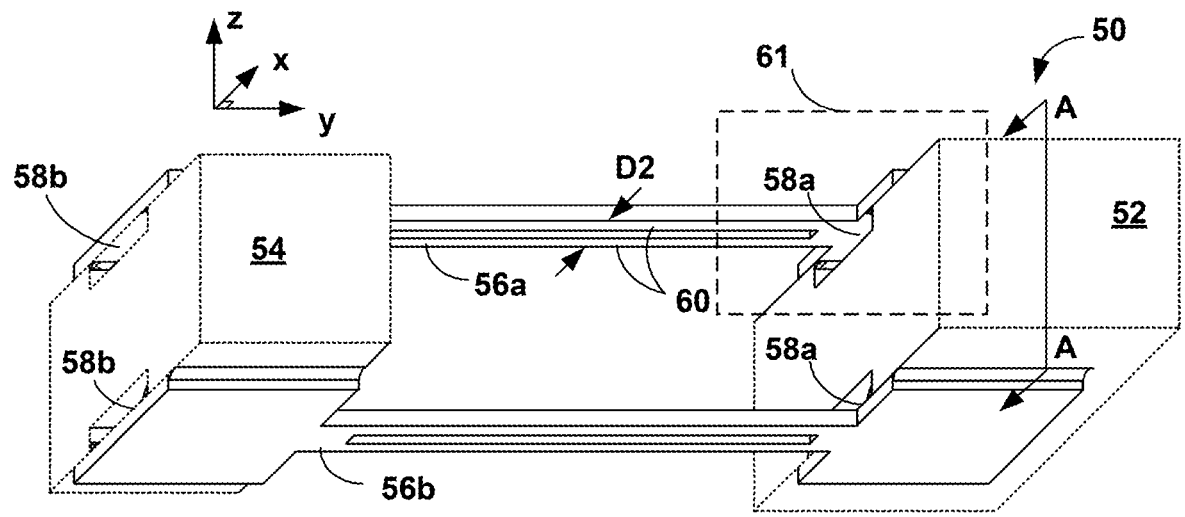
Figure 3C:
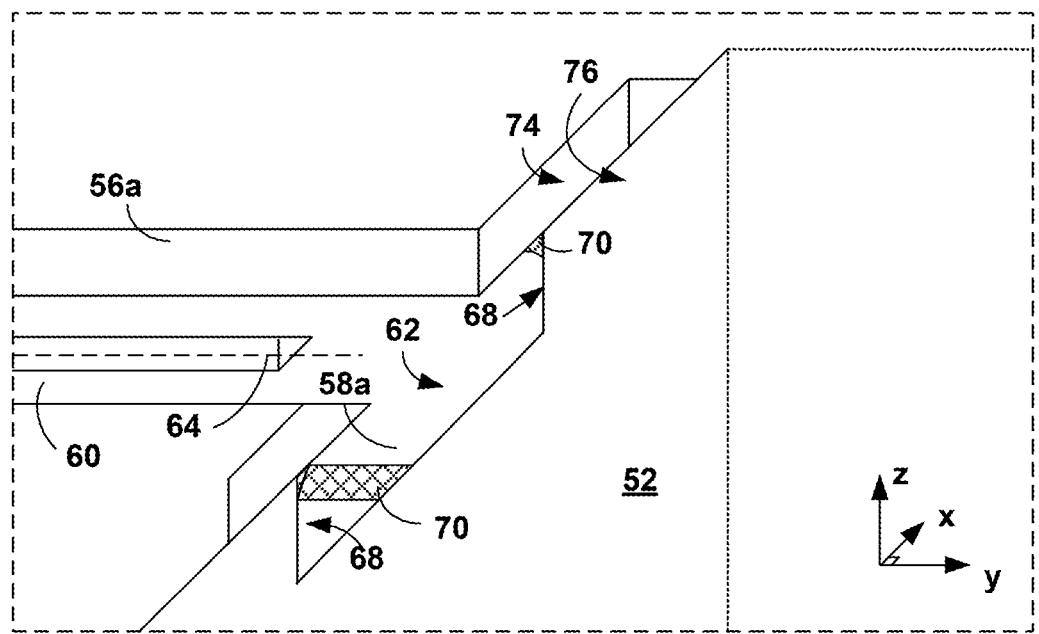
Figure 3D:
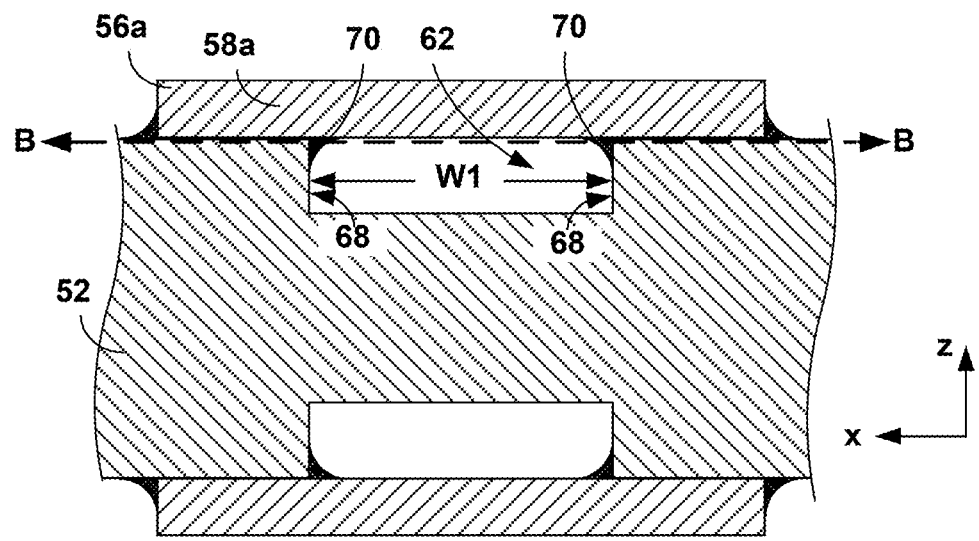
Figure 3E:
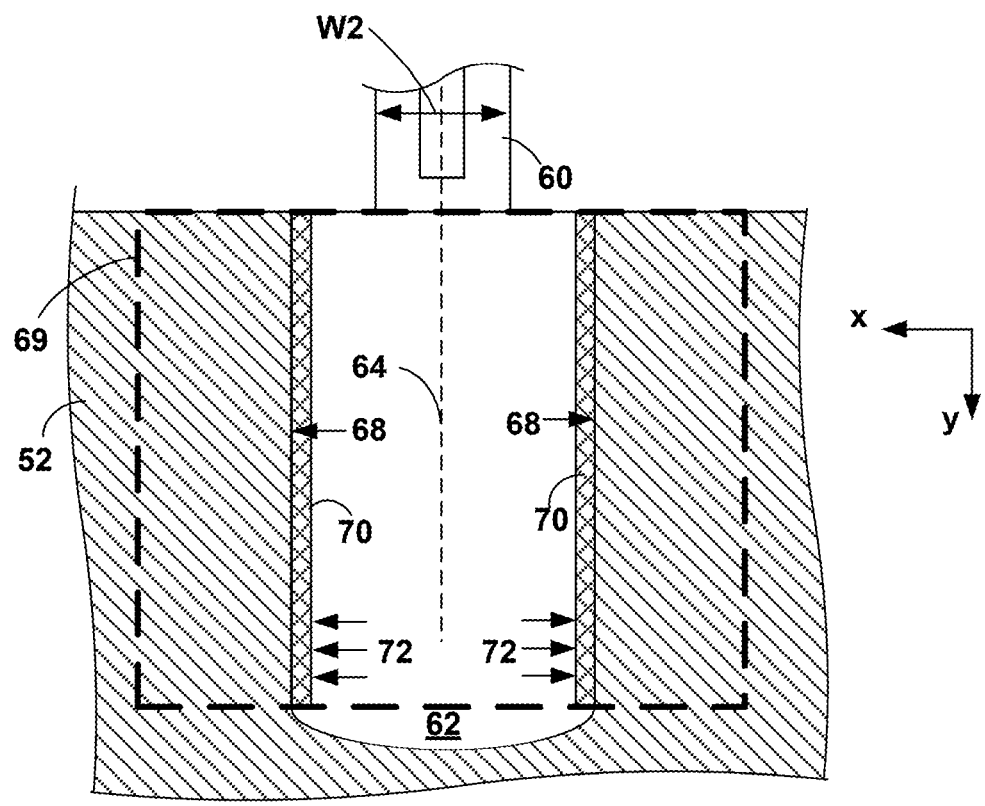

FIGS. 3A-3C are conceptual diagrams illustrating perspective views of an example proof mass assembly 50 that includes a proof mass 52, a proof support 54, and a first resonator 56a and a second resonator 56b (also referred to as resonator 56 or resonators 56). FIG. 3A illustrates an exploded view of proof mass assembly 50 and FIG. 3C is an enlarged image of segment 61 from FIG. 3B. FIGS. 3D-3E illustrate cross-sectional views of proof mass assembly 50 and the connections between resonators 56 and proof mass 52. FIG. 3D is a cross-sectional view of first and second resonators 56 and proof mass 52 taken along line A-A of FIG. 3B. FIG. 3E is a cross-sectional view of one of resonators 56 and proof mass 52 taken along line B-B of FIG. 3D. For simplicity of description, the bonding techniques and structures used throughout this specification will be primarily described with respect to the proof mass (e.g., proof mass 52) and the first bond pad of the first resonator (e.g., bond pad 58a of resonator 56a). However, one of ordinary skill in the art will understand that the described bonding techniques and structures can be applied equally to the bonds formed between the first or second bond pad of either of the first or second resonators and the respective bonding regions of either the proof mass or the proof support. Thus, while the description for FIGS. 3A-3E will focus on the bonding structures between first major surface 53A of proof mass 52 and first bond pad 58a of first resonator 56a, the described bonding structures may be used to bond each of first and second bond pads 58a and 58b to proof mass 52 or proof support 54, respectively.

Each resonator 56 includes a respective first bond pad 58a a respective second bond pad 58b positioned at opposite ends of a respective pair of parallelly extending elongated tines 60. First and second bond pads 58a and 58b of first resonator 56a are bonded via adhesive 66 to a first major surface 53A of proof mass 52 and a first major surface 55A of proof support 54, respectively. Likewise, adhesive 66 bonds first and second bond pads 58a and 58b of second resonator 56b to a second major surface 53B of proof mass 52 and a second major surface 55B of the proof support 54, respectively. In some examples, the sensing axes of first and second resonators 56a and 56b (e.g., longitudinal axis 64) may be substantially aligned within the plane of movement of proof mass 52 (e.g., the y-z plane of FIG. 3B).

As best seen in FIGS. 3A and 3D, first major surface 53A of proof mass 52 includes a bond region 69 for bonding first bond pad 58a of first resonator 56a to proof mass 52. Bond region 69 is defined as the area within the dashed boundary line and contains the surface or surfaces of proof mass 52 that adhere to first bond pad 58a. In some examples, bond region 69 includes at least one channel 62 recessed (e.g., etched or machined) into major surface 53A of proof mass 52. Channel 62 may define a long axis that extends along proof mass 52 in a direction substantially parallel (e.g., parallel or nearly parallel) with longitudinal axis 64 (e.g., the sensing axis established by tines 60) of resonator 56a. In some examples, a center line of channel 62 may align with a center of bond region 69. In some examples, channel 62 may extend beyond the borders of bond region 69 (e.g., as shown in FIG. 3E).

In some examples, channel 62 is defined by a pair of facing walls 68 that each extend in a direction substantially parallel (e.g., parallel or nearly parallel) to longitudinal axis 64. Walls 68 may be separated by a width (W1) measured in a direction substantially perpendicular (e.g., perpendicular or nearly perpendicular) to longitudinal axis 64. Width (W1) may be equal to or greater than the width of the pair elongated tines 60 (W2) measured in the same direction (e.g., the distance equal to the combined widths of elongated tines 60 plus the distance of the gap therebetween). In some examples, the center line of channel 62 may be substantially aligned with longitudinal axis 64 established by tines 60 such that longitudinal axis 64 effectively bisects channel 62.

By forming channel 62 in the above described manner, the bonding surface of bond region 69 is effectively separated into two bonding surfaces that are separated by channel 62. Further, channel 62 effectively eliminates the presence of a bonding surface directly adjacent to, or aligned with, longitudinal axis 64 of tines 60. The configuration will also eliminate the presence of any adhesive fillet (e.g., adhesive fillets 70) being formed directly adjacent to tines 60 thereby reducing the amount of thermally induced strain exerted by the adhesive fillets on elongated tines 60.

Additionally, to the extent that adhesive fillets 70 form at the intersections between channel 62 of bond region 69 and first bond pad 58a, such adhesive fillets 70 will extend along the intersection in a direction substantially parallel (e.g., parallel or nearly parallel) to longitudinal axis 64 of tines 60 of first resonator 56a rather than extending in a direction perpendicular to axis 64. In some examples, adhesive fillets 70 may produce thermally induced strain within the fillet either longitudinally along the longitudinal axis of the fillet (e.g., in line with axis 64) or in the normal direction (e.g., perpendicular direction to axis 64). It has been found that when adhesive fillets 70 extend perpendicular to axis 64, the normal strain of the fillet can include loads on tines 60 which contribute to measurement error. Such measurement error can be reduced by aligning the longitudinal axis of the adhesive fillets 70 in a direction substantially parallel (e.g., parallel or nearly parallel) to axis 64 and eliminating the presence of fillets aligned with tines 60. Without wanting to be bound to a specific theory, it is believed that due to the general length of adhesive fillet 70, the thermally induced strain within the fillet in the longitudinal direction becomes somewhat balanced along the total length of the fillet due to opposing forces generated within the adhesive fillet. The balancing effect results in a reduced strain in the longitudinal direction of adhesive fillet 70 compared to the normal direction, and therefore a reduces the thermal strain and error exerted on the adjacent resonator 56a along the sensing axis by having the normal thermally induced strain align substantially perpendicular (e.g., perpendicular or nearly perpendicular to the sensing axis).

In some examples, by having adhesive fillets 70 extend in a longitudinal direction aligned substantially parallel with longitudinal axis 64 as shown in FIGS. 3A-3E, the thermally induced strain created by adhesive fillets 70 in the direction of the sensing axis of the resonator (e.g., longitudinal axis 64) may be reduced due to the described balancing effect longitudinally across the fillet and elimination of the normal strain in the direction of the sensing axis. Additionally, adhesive fillets 70 are formed as a pair along facing walls 68, which are set back from the pair of elongated tines 60 (e.g., outside the strip defined by width W2). In some examples, having adhesive fillets 70 formed as a pair may also create balancing effect across channel 62 as each adhesive fillet 70 will create a thermally induced strained in an opposite direction of the other adhesive fillet 70 (e.g., shown by lines 72) in a direction substantially perpendicular to longitudinal axis 64 of the tines 60.

In some examples, to further reduce the potential for an error inducing effect induced by the presence of adhesive fillets 70 around bond region 69, the front edge 74 of bond pad 58a may be aligned substantially flush (e.g., flush or nearly flush) with the front edge 76 of proof mass 52. Having front edges 74 and 76 (e.g., the edges closest to tines 60) aligned substantially flush with one another will reduce or eliminate the presence of a 90° intersection between bond pad 58a and proof mass 52, in turn reducing or eliminating the presence of an adhesive fillet along the substantially flush edges 74 and 76.

Figure 4A:
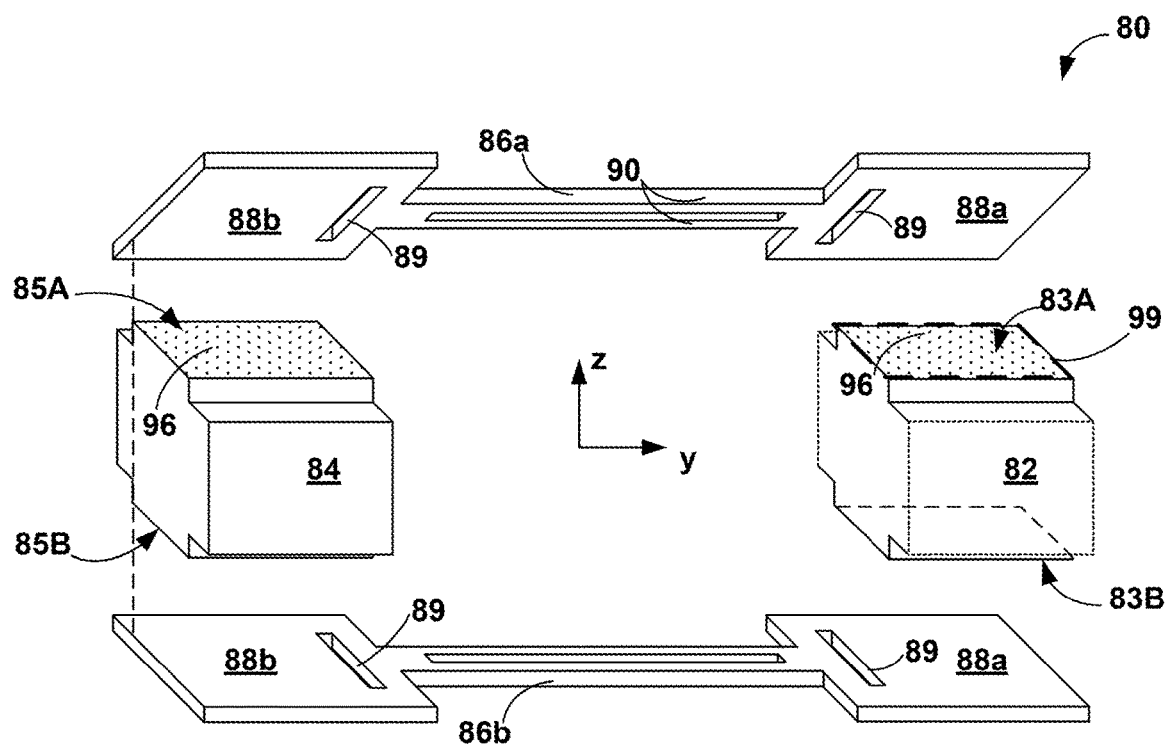
FIGS. 4A-4E are conceptual diagrams illustrating various views of another example proof mass assembly that includes a proof mass, a proof support, and first and second resonators.
Figure 4B:
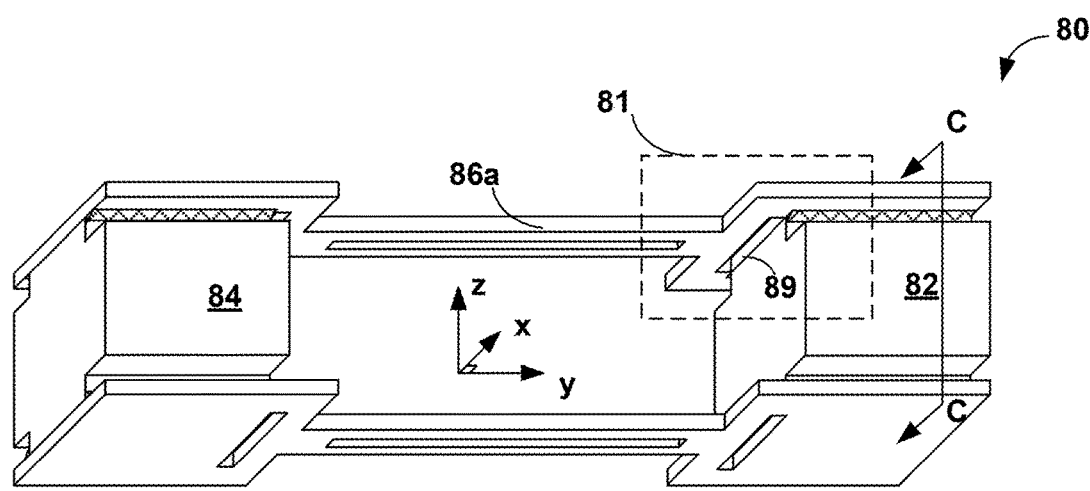
Figure 4C:
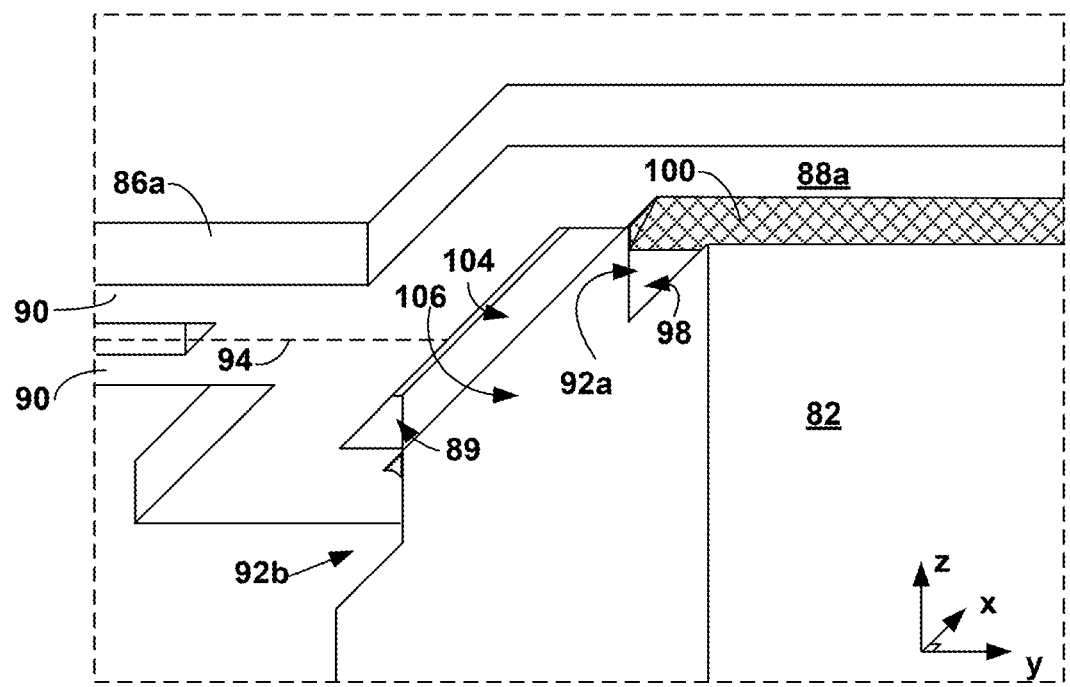
Figure 4D:
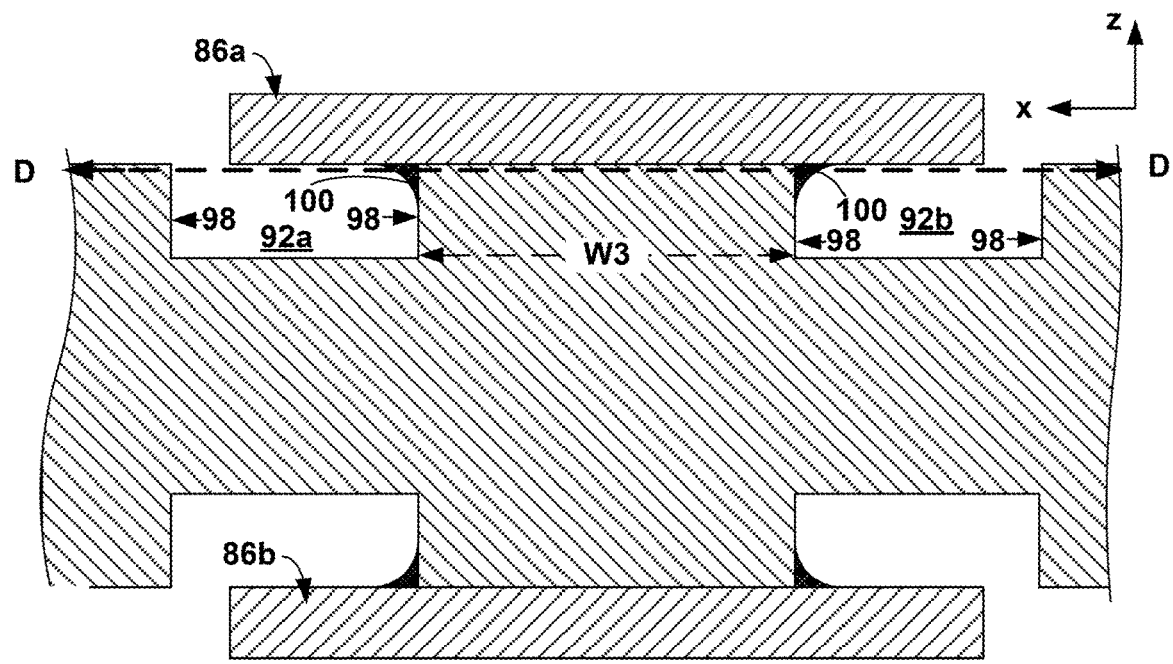
Figure 4E:
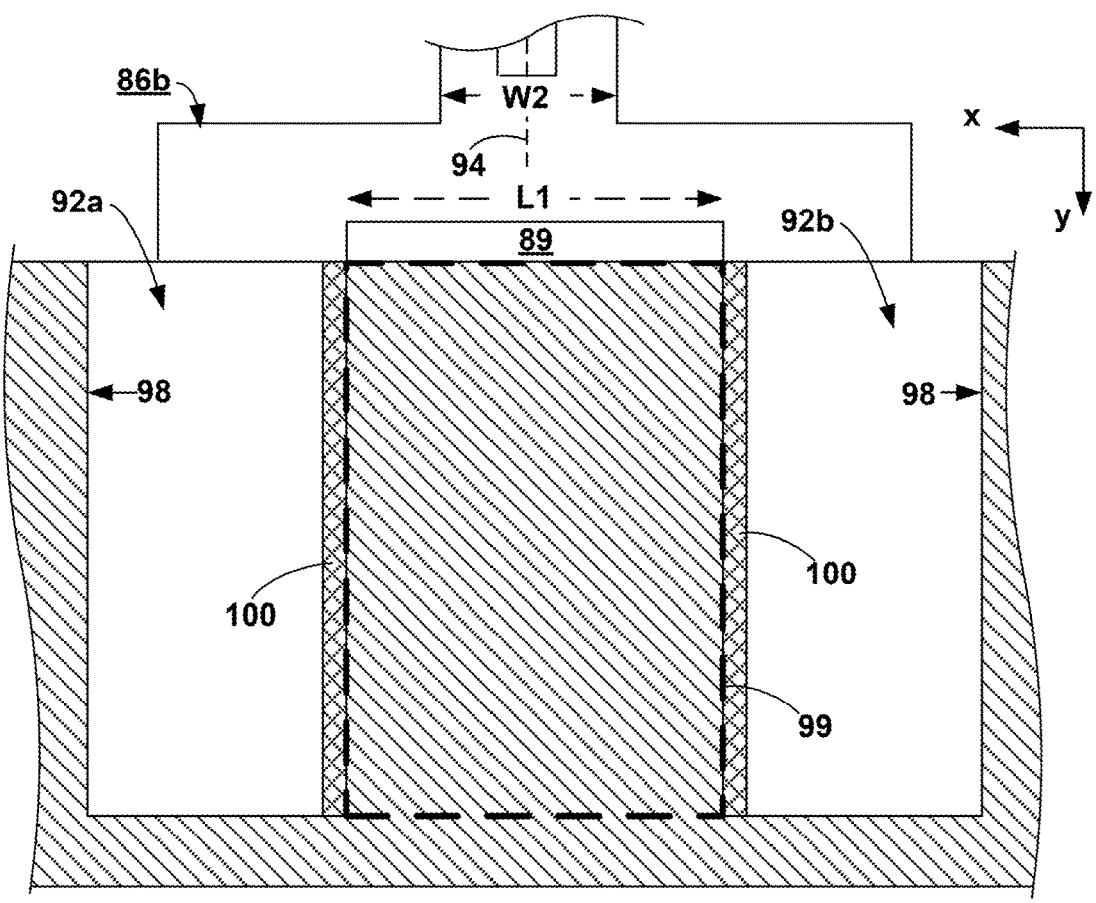

FIGS. 4A-4C are conceptual diagrams illustrating perspective views of another example proof mass assembly 80 that includes a proof mass 82, a proof support 84, and a first and a second resonator 86a and 86b (also referred to as resonator 86 or resonators 86). FIG. 4A provides an exploded view of proof mass assembly 80 and FIG. 4C is an enlarged image of segment 81 from FIG. 4B. FIGS. 4D and 4E illustrate cross-sectional views of proof mass assembly 80 and the connections between resonators 86 and proof mass 82. FIG. 4D is a cross-sectional view of the first and second resonators 86 and proof mass 82 taken along line C-C of FIG. 4B. FIG. 4E is a cross-sectional view of proof mass 82 taken along line D-D of FIG. 4D.

Each resonator 86 includes a respective first bond pad 88a and a respective second bond pad 88b positioned at opposite ends of a respective pair of parallelly extending elongated tines 90. First and second bond pads 88a and 88b of first resonator 86a are bonded using an adhesive 96 to a first major surface 83A of proof mass 82 and a first major surface 85A of proof support 84, respectively. Likewise, adhesive 96 bonds first and second bond pads 88a and 88b of second resonator 86b to a second major surface 83B of proof mass 82 and a second major surface 85B of the proof support 84, respectively. In some examples, the sensing axes of first and second resonators 86a and 86b (e.g., longitudinal axis 94) may be aligned within the plane of movement of proof mass 82 (e.g., the y-z plane of FIG. 4B). Each of respective first and second bond pads 88a and 88b also includes a respective slot 89 extending in a direction substantially perpendicular to longitudinal axis 94 of the tines 90. Each respective slot 89 comprises a length (L1) measured in the direction substantially perpendicular to longitudinal axis 94 of tines 90. In some examples, the length (L1) may be greater than the width of bond region 99 (W3).

As best seen in FIGS. 4A and 4E, first major surface 83A of proof mass 82 includes a bond region 99 for bonding first bond pad 88a of first resonator 86a to proof mass 82. Bond region 99 may be defined as the area within the dashed boundary line and contains the surface that adheres first bond pad 88a to proof mass 82. The edges of bond region 99 may be defined by channels 92a and 92b (collectively "channels 92") which are recessed (e.g. etched, or machined) into major surface 83A of proof mass 82. Each of channels 92 may define a long axis that extends along proof mass 92 in a direction substantially parallel (e.g., parallel or nearly parallel) with the longitudinal axis 94 (e.g., the sensing axis established by tines 90) of resonator 96a. In some examples, longitudinal axis 94 of resonator 86a may substantially bisect (e.g., bisect or nearly bisect) a center of bond region 99.

In some examples, channels 92a and 92b may be spaced apart from one another so that bond region 99 includes a single bonding surface that defines a width (distance W3) measured in a direction substantially perpendicular (e.g., perpendicular or nearly perpendicular) to longitudinal axis 94. In some examples, the width (W3) of bond region 99 may be about equal to or less than the length (L1) of the corresponding slot 89 of first bond pad 88a of first resonator 86a. In some examples, the front edge 104 of bond pad 88a may be aligned substantially flush (e.g., flush or nearly flush) with the front edge 106 of proof mass 82. Having front edges 104 and 106 (e.g., the edges closest to tines 90) aligned substantially flush with one another, combined with having width (W3) equal to or less than length (L1), reduces or eliminates the presence of a 90° intersection between bond pad 88a and proof mass 82 along the front edge and in turn reduce or eliminating the presence of an adhesive fillet along the substantially flush edges 104 and 106.

Additionally, by forming channels 92 in the above described manner, to the extent adhesive fillets 100 form, adhesive fillets 100 will form at the intersection between channels 92 of bond region 99 and first bond pad 88a, e.g., along the edge of walls 98 that contact first bond pad 88a. Adhesive fillets 100 will each extend along the intersection in a direction substantially parallel (e.g., parallel or nearly parallel) to longitudinal axis 94 of tines 90 of first resonator 86a rather than extending in a direction perpendicular to axis 84. As described above, by forming adhesive fillets 100 in this manner, the normal thermally induced strain within adhesive fillets 100 (e.g., strain perpendicular to the longitudinal axis of the fillet) will be aligned substantially perpendicular (e.g., perpendicular or nearly perpendicular) with the sensing axis of resonator 86a (e.g., in line with axis 94), thereby reducing the source of measurement error imposed on resonator 86a.

Figure 5A:
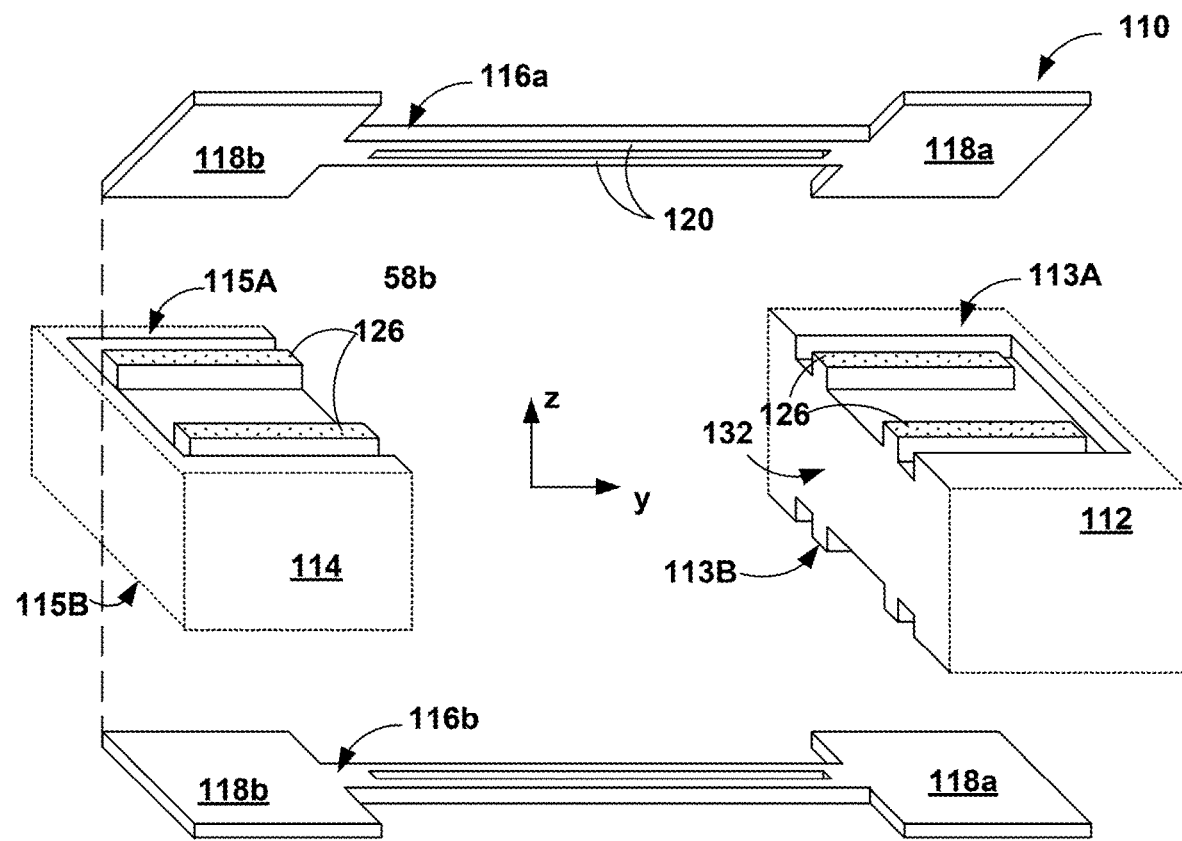
FIGS. 5A-5E are conceptual diagrams illustrating various views of another example proof mass assembly that includes a proof mass, a proof support, and first and second resonators.
Figure 5B:
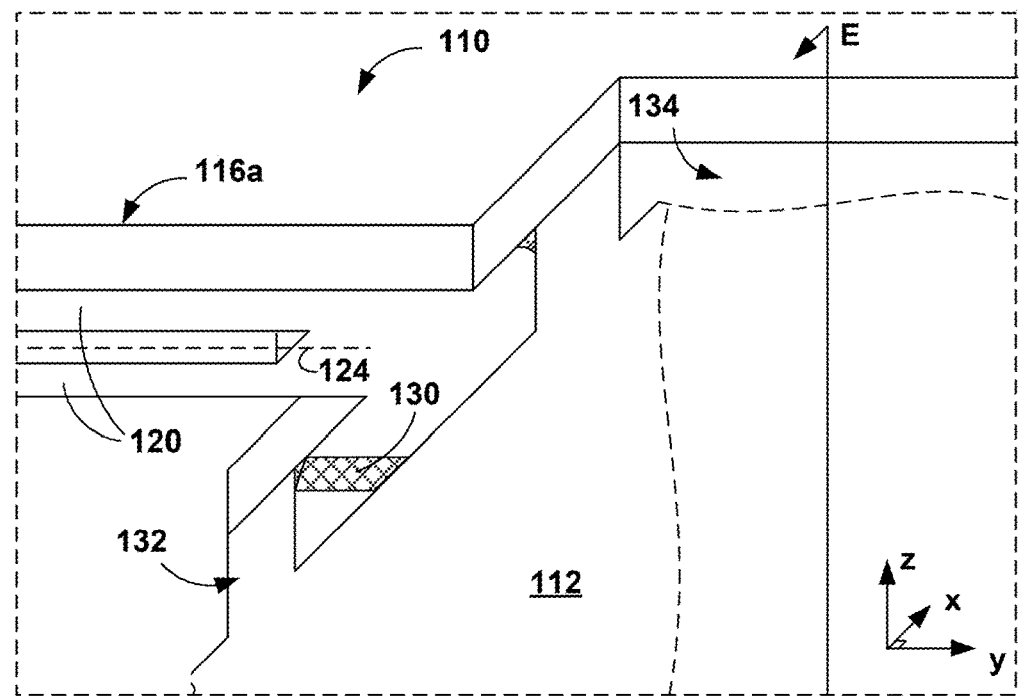
Figure 5C:
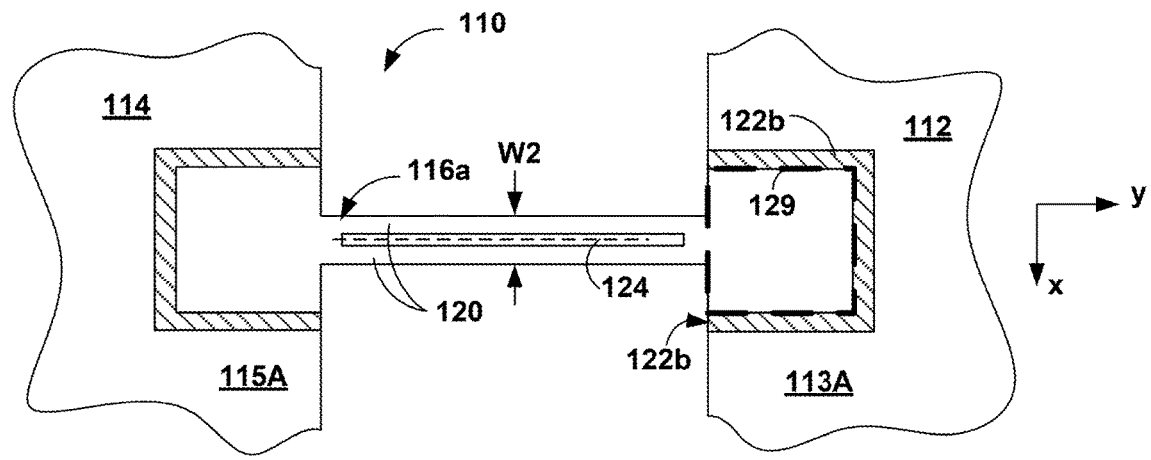
Figure 5D:
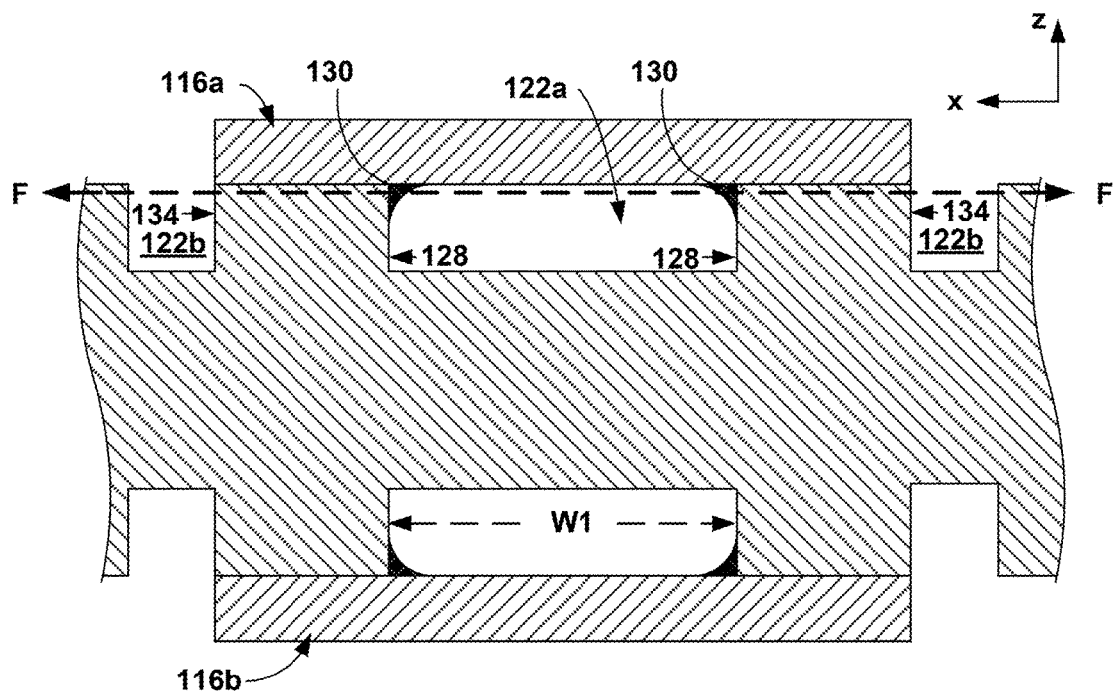
Figure 5E:
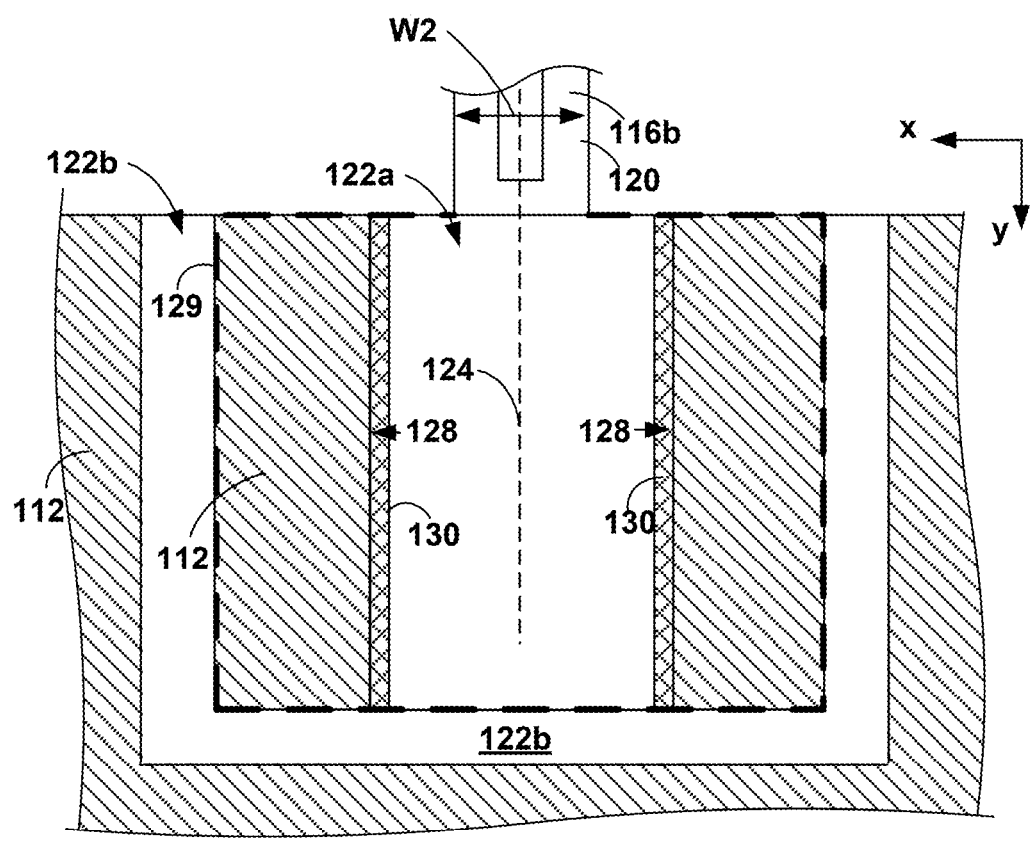

FIGS. 5A and 5B are conceptual diagrams illustrating perspective views of another example proof mass assembly 110 that includes a proof mass 112, a proof support 114, and a first resonator 116a and a second resonator 116b (also referred to as resonator 116 or resonators 116). FIG. 5A illustrates an exploded view of proof mass assembly 110. FIG. 5C is top-down view of proof mass assembly 110. FIG. 5D is a cross-sectional view of first and second resonators 116 and proof mass 112 taken along line E-E of FIG. 5B (e.g., similar to the cross-sectional views of FIGS. 3D and 4D). FIG. 5E is a cross-sectional view of proof mass 112 taken along line F-F of FIG. 5D.

Each resonator 116 includes a respective first bond pad 118a and a respective second bond pad 118b positioned at opposite ends of a respective pair of parallelly extending elongated tines 120. First and second bond pads 118a and 118b of first resonator 116a are bonded using an adhesive 126 to a first major surface 113A of proof mass 112 and a first major surface 115A of proof support 114, respectively. Likewise, adhesive 126 bonds first and second bond pads 118a and 118b of second resonator 116b to a second major surface 113B of proof mass 112 and a second major surface 115B of the proof support 114 respectively. In some examples, the sensing axes of first and second resonators 116a and 116b (e.g., longitudinal axis 124) may be substantially aligned within the plane of movement of proof mass 112 (e.g., the y-z plane of FIG. 5B).

As best seen in FIGS. 5C and 5E, first major surface 113A of proof mass 112 includes a bond region 129 for bonding first bond pad 118a of first resonator 116a to proof mass 112. Bond region 129 is defined as the area within the dashed boundary line containing the surface or surfaces of proof mass 112 that adhere to first bond pad 118a. Bond region 129 may include a first channel 129a recessed into major surface 113A of proof mass 112 extending along proof mass 112 in a direction substantially parallel (e.g., parallel or nearly parallel) with the longitudinal axis 124 (e.g., the sensing axis established by tines 120) of resonator 116a. In some examples, channel 122a is defined by a pair of facing walls 128 that each extend in a direction substantially parallel (e.g., parallel or nearly parallel) to longitudinal axis 124. Walls 128 may be separated by a width (W1) measured in a direction substantially perpendicular (e.g., perpendicular or nearly perpendicular) to longitudinal axis 124. Width (W1) may be equal to or greater than the width of the pair elongated tines 120 (W2) measured in the same direction (e.g., the distance equal to the combined widths of elongated tine 120 plus the distance of the gap therebetween). In some examples, the center line of first channel 122a may be substantially aligned with longitudinal axis 124 such that longitudinal axis 124 effectively bisects first channel 122a. In some examples, the center line of first channel 122a may define the center line of bond region 129 such that longitudinal axis 124 of resonator 116a may substantially bisect (e.g., bisect or nearly bisect) both a center of bond region 129 and the center line of first channel 122a.

As described above with respect to channel 62, by forming first channel 122a in this manner, adhesive fillets 130 may form at the intersection between channel 122a of bond region 129 and first bond pad 118a, e.g., along the edge of walls 128 that contact first bond pad 118a. Adhesive fillets 130 will each extend along the intersection in a direction substantially parallel (e.g., parallel or nearly parallel) to longitudinal axis 124 of tines 120 of first resonator 116a rather than extending in a direction perpendicular to axis 124. As described above, by forming adhesive fillets 130 in this manner, the normal thermally induced strain within adhesive fillets 130 (e.g., strain perpendicular to the longitudinal axis of the fillet) will be aligned substantially perpendicular (e.g., perpendicular or nearly perpendicular) with the sensing axis of resonator 116a (e.g., in line with axis 124), thereby reducing the source of measurement error imposed on resonator 116a. Additionally, the normal thermally induced strain established in the direction perpendicular to the longitudinal axis of one of adhesive fillets 130 will be counterbalanced by the normal thermally induced strain established in the opposite direction by the other adhesive fillet 130. In some examples, first channel 122*a* may be substantially similar to channel 62 of proof mass assembly 50.

In some examples, the perimeter of the bond region 129 (e.g., the boarder defined by the dashed line) may be defined (e.g., edged) by a second channel 122*b* etched into first major surface 113A. Second channel 122*b* may be positioned such that the perimeter of bond region 129 is substantially equal in size or area to the perimeter of respective first bond pad 118*a* of first resonator 116*a*. In this manner, when bonding first bond pad 118*a* to proof mass 112, all perimeter edges (e.g., sides) of first bond pad 118*a* may be aligned substantially flush with the edges 134 of second channel 122*b* that define the perimeter of bond region 129 and may be aligned substantially flush with the front edge 132 of proof mass 112. Having the perimeter edges of first bond pad 118*a* substantially flush with edges 132 and 134 of bond recess 112 may reduce or eliminate the presence of adhesive fillets 130 along the perimeter edges of first bond pad 118*a*. In some examples, second channel 122*b* may form three of the perimeter edges of bond region 129 as shown in FIG. 5E. In other examples, depending on the perimeter shape of respective first bond pad 118*a*, second channel 122*b* may form less than three (e.g., two or one) or more than three perimeter edges of bond region 129. Additionally, or alternatively, the edges formed by second channel 122*b* may be curvilinear.

In some examples, the above described channels 62, 92, 122*a*, and 128*a* may be formed such that one or more of the respective walls defining the channels (e.g., walls 68, 98, 128, and 134) are aligned at approximately a 90° angle with the bonding surfaces of first bond pads 58*a*, 88*a*, and 118*a*. In other examples, one or more of walls 68, 98, and 128 may be cut such that the walls intersect the bonding surfaces of first bond pads 58*a*, 88*a*, and 118*a* respectively at an angle that is greater than 90° up to about 135°. Angling one or more of walls 68, 98, and 128 will reduce the sharpness of the intersecting surfaces of walls 68, 98, and 128 and first bond pads 58*a*, 88*a*, and 118*a*, thereby reducing the size of the corresponding adhesive fillet 70, 100, 130 along the intersecting edge.

The above described slots 89 channels 62, 92, 122*a*, and 128*a* may be formed into the described resonators or proof mass/support respectively using any suitable technique including, but not limited, to photo chemical etching, laser etching, mechanical machining, or the like. In some examples, above described slots and channels may formed into the respective components prior to being bonded together. In other examples, one or more of slots 89 channels 62, 92, 122*a*, and 128*a* may be formed into the proof mass assemblies after bonding the respective components together.

Various examples have been described. These and other examples are within the scope of the following claims.

What is claimed is:

1. A proof mass assembly comprising:
 a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator;
 a proof mass comprising a first major proof mass surface and a second major proof mass surface, wherein the first major proof mass surface comprises a bond region comprising at least one channel extending in a direction substantially parallel to a longitudinal axis of the respective pair of elongated tines of the first resonator;
 a proof support comprising a first major proof support surface and a second major proof support surface;
 at least one flexure connecting the proof mass to the proof support; and
 an adhesive bonding the respective first bond pad of the first resonator to the bond region of the first major proof mass surface, bonding the respective second bond pad of the first resonator to the first major proof support surface, bonding the respective first bond pad of the second resonator to the second major proof mass surface, and bonding the respective second bond pad of the second resonator to the second major proof support surface.

2. The proof mass assembly of claim 1, wherein the at least one channel defines a width measured in the direction substantially perpendicular to the longitudinal axis, the width of the at least one channel being greater than a width of the respective pair of elongated tines of the first resonator.

3. The proof mass assembly of claim 1, wherein the longitudinal axis is substantially aligned with a center line of the at least one channel.

4. The proof mass assembly of claim 1, wherein the at least one channel is defined by a pair of facing walls, and wherein each wall of the pair of facing walls extends in a direction substantially parallel to the longitudinal axis.

5. The proof mass assembly of claim 4, wherein each wall of the pair of facing walls forms an angle of about 90° with a bonding surface of the respective first bond pad of the first resonator.

6. The proof mass assembly of claim 1, further comprising at least one adhesive fillet formed at an intersection between the at least one channel and the respective first bond pad of the first resonator, wherein the adhesive fillet extends along the intersection in a direction substantially parallel to the longitudinal axis.

7. The proof mass assembly of claim 1, wherein a front edge of the respective first bonding pad of the first resonator is aligned substantially flush with an edge of the proof mass.

8. The proof mass assembly of claim 1, wherein the at least one channel of the bond region comprises a first channel extending in the direction substantially parallel to the longitudinal axis, the proof mass assembly further comprising a second channel on the first major proof surface, at least a portion of a perimeter of the bond region being defined by the second channel, the perimeter of the bond region being substantially equal in size to a perimeter of the respective first bond pad of the first resonator.

9. The proof mass assembly of claim 8, wherein edges of the respective first bond pad of the first resonator are aligned substantially flush with edges of the bond region of the proof mass.

10. The proof mass assembly of claim 9, wherein the second channel defines at least three edges of the bond region.

11. The proof mass assembly of claim 1, wherein the channel extends beyond a boundary defined by the bond region.

12. A proof mass assembly comprising:
 a first and a second resonator, wherein each respective resonator comprises a respective first bond pad, a respective second bond pad, and a respective pair of elongated tines, and wherein the respective first bond pad and the respective second bond pad are positioned at opposite ends of the respective pair of elongated tines of the respective resonator; the respective first bond pad and the respective second bond pad each comprising a respective slot extending in a direction substantially perpendicular to a longitudinal axis of the respective elongated tines, each respective slot comprising a length measured in the direction substantially perpendicular to the longitudinal axis of the respective elongated tines;

a proof mass comprising a first major proof mass surface and a second major proof mass surface, wherein the first major proof mass surface comprises a bond region, the bond region being edged by at least a pair of channels in the first major proof mass surface that extend in a direction substantially parallel with the longitudinal axis of the first resonator, the bond region comprising a width measured in the direction substantially perpendicular to the longitudinal axis of the first resonator, wherein the width is about equal to or less than the length of the respective slot of the respective first bond pad of the first resonator;

a proof support comprising a first major proof support surface and a second major proof support surface;

at least one flexure connecting the proof mass to the proof support; and an adhesive bonding the respective first bond pad of the first resonator to the bond region of the first major proof mass surface, wherein an edge of the bond region is aligned substantially flush with an edge of the respective slot of the respective first bond pad, bonding the respective second bond pad of the first resonator to the first major proof support surface, bonding the respective first bond pad of the second resonator to the second major proof mass, and bonding the respective second bond pad of the second resonator to the second major proof support surface.

13. The proof mass assembly of claim 12, wherein the width of the bond region is less than the length of the respective slot of the respective first bond pad of the first resonator.

14. The proof mass assembly of claim 12, wherein the respective slot of the respective first bond pad of the first resonator eliminates the presence of an adhesive fillet extending along the edge of the slot.

15. The proof mass assembly of claim 12, wherein the longitudinal axis of the first resonator is aligned with a center line of the bond region.

16. The proof mass assembly of claim 12, wherein the pair of channels each comprise a respective wall that forms an edge of the bond region, each respective wall extending in a direction substantially parallel to the longitudinal axis of the first resonator.

17. The proof mass assembly of claim 16, further comprising at least one adhesive fillet formed at an intersection between at least one of the respective walls and the respective first bond pad of the first resonator, wherein the adhesive fillet extends along the intersection in a direction substantially parallel to the longitudinal axis of the first resonator.

18. The proof mass assembly of claim 16, wherein the respective walls form an angle equal to about 90° with a bonding surface of the respective first bond pad of the first resonator.

19. A method of forming a proof mass assembly, the method comprising: forming a first and a second resonator, wherein each respective resonator comprises a respective first bond pad, a respective second bond pad, and a respective pair of elongated fines, and wherein the respective first bond pad and the respective second bond pad are positioned at opposite ends of the respective pair of elongated fines of the respective resonator;

forming a structure comprising:
a proof mass comprising a first major proof mass surface and a second major proof mass surface, wherein the first major proof mass surface comprises a bond region comprising at least one channel extending in a direction substantially parallel to a longitudinal axis of the respective pair of elongated fines of the first resonator;

a proof support comprising a first major proof support surface and a second major proof support surface; and at least one flexure connecting the proof mass to the proof support; and using an adhesive, bonding the respective first bond pad of the first resonator to the bond region of the first major proof mass surface, bonding the respective second bond pad of the first resonator to the first major proof support surface, bonding the respective first bond pad of the second resonator to the second major proof mass, and bonding the respective second bond pad of the second resonator to the second major proof support surface.

20. The method of claim 19, wherein the at least one channel extends beyond a boundary defined by the bond region.

* * * * *